US008172329B2

United States Patent
Kim (10) Patent No.: US 8,172,329 B2
(45) Date of Patent: May 8, 2012

(54) ELECTROMOTIVE HEADREST FOLDING APPARATUS FOR VEHICLES

(75) Inventor: Sang Ho Kim, Incheon-si (KR)

(73) Assignee: Hyundai Motor Company, Seoul (KR)

( * ) Notice: Subject to any disclaimer, the term of this patent is extended or adjusted under 35 U.S.C. 154(b) by 270 days.

(21) Appl. No.: 12/324,565

(22) Filed: Nov. 26, 2008

(65) Prior Publication Data

US 2009/0152925 A1 Jun. 18, 2009

(30) Foreign Application Priority Data

Dec. 14, 2007 (KR) .................. 10-2007-0131004

(51) Int. Cl.
*A47C 7/36* (2006.01)

(52) U.S. Cl. ....................... 297/408; 297/410

(58) Field of Classification Search ............ 297/216.12, 297/391, 408, 409, 410
See application file for complete search history.

(56) References Cited

U.S. PATENT DOCUMENTS

| 4,765,683 | A | * | 8/1988 | Hattori .................. 297/410 |
| 5,288,129 | A | * | 2/1994 | Nemoto .................. 297/410 |
| 5,590,933 | A | * | 1/1997 | Andersson .............. 297/408 |
| 5,669,666 | A | * | 9/1997 | Lee ........................ 297/408 |
| 5,918,940 | A | * | 7/1999 | Wakamatsu et al. .... 297/410 |
| 6,024,406 | A | * | 2/2000 | Charras et al. ........ 297/216.14 |
| 6,604,788 | B1 | * | 8/2003 | Humer .................. 297/216.13 |
| 2007/0145803 | A1 | * | 6/2007 | Kopetzky et al. ....... 297/410 |

FOREIGN PATENT DOCUMENTS

| JP | 1990 224705 | 9/1990 |
| JP | 1995 39432 | 2/1995 |

* cited by examiner

Primary Examiner — David Dunn
Assistant Examiner — Philip Gabler
(74) Attorney, Agent, or Firm — Morgan, Lewis & Bockius LLP (57) ABSTRACT

An electromotive headrest folding apparatus includes a rotating shaft, a rotary member, a vertical moving unit and a locking unit. The rotating shaft is coupled at opposite ends thereof to a seat back frame so as to be rotatable, and is provided with a striker. The rotary member is mounted to the rotating shaft. A headrest pole is fitted into the rotary member. The vertical moving unit is fastened to the rotary member through a mounting bracket. The vertical moving unit moves the headrest pole upwards or downwards. The locking unit is mounted to the seat back frame and has a locking piece, to which a striker is locked.

12 Claims, 9 Drawing Sheets

ELECTROMOTIVE HEADREST FOLDING APPARATUS FOR VEHICLES

CROSS-REFERENCE TO RELATED APPLICATION

The present application claims priority to Korean Application No. 10-2007-0131004, filed on Dec. 14, 2007, the entire contents of which applications is incorporated herein for all purposes by this reference.

BACKGROUND OF THE INVENTION

1. Field of the Invention

The present invention relates to an electromotive headrest folding apparatus for vehicles which moves a headrest upwards or downwards using electric power and enables folding of the headrest.

2. Description of Related Art

Generally, headrests for vehicles are provided on the upper ends of backs of seats to support the heads and necks of passengers. The headrests serve to prevent the necks of the passengers from being bent backwards when vehicle collisions occur, thus preventing the heads and necks of the passengers from being injured. Furthermore, when the vehicles travel under normal conditions, the headrests serve to support the heads of the passengers to ensure comfortable rides to the passengers.

Such a headrest includes a cushion pad, and a headrest pole, which supports the pad and is coupled to a seat back. In the headrest, the headrest pole is inserted into a headrest pole guide, which is longitudinally provided in the upper end of the seat back. The headrest is constructed such that the height thereof is adjustable to correspond to a passenger's sitting height.

Recently, an electromotive active headrest, which is constructed such that, when a seat is folded forwards, the headrest is also folded, was proposed. However, in the case of the electromotive active headrest, power and signals are transmitted through wires between electronic elements in the headrest. Thus, when the headrest pole is rotated at 90° or more, the power and signal processing of the electronic elements through the wires may be incorrectly conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for an electromotive headrest folding apparatus for vehicles which adjusts the height of a headrest through an electromotive method and enables folding of the headrest.

An aspect of the present invention is directed to an electromotive headrest folding apparatus for vehicles, including a rotating shaft rotatably coupled at opposite ends thereof to a seat back frame, a rotary member coupled to the rotating shaft, wherein a headrest pole may be slidably fitted into the rotary member, a vertical moving unit fastened to the rotary member through a mounting bracket, the vertical moving unit moving the headrest pole upwards or downwards, and/or a locking unit mounted to the seat back frame and having a locking piece, to which the rotary member may be selectively locked.

A striker may be provided on the rotary member. The vertical moving unit may include a drive motor mounted to the mounting bracket, a rotary screw coupled to the drive motor so as to be rotatable using operation of the drive motor, and/or a vertically movable member engaging with the rotary screw so as to be movable upwards or downwards according to rotation of the rotary screw, the vertically movable member being fastened to a lower end of the headrest pole. The electromotive headrest folding apparatus for vehicles may further include a folding button for applying power to the drive motor to release the striker from the locking piece.

The locking unit may include a support bracket mounted to the seat back frame, the locking piece rotatably hinged to the support bracket, the locking piece having in a first end thereof a locking notch, to which the striker may be locked, a release piece rotatably hinged to the support bracket such that, when the headrest pole is moved to an uppermost position, a first end of the release piece may be pushed upwards and rotated by the vertically movable member, and/or an elastic member connecting a second end of the release piece to a second end of the locking piece, so that the striker may be released from the locking piece by rotation of the release member.

The release piece further may include a protrusion selectively coupled to a receiving notch formed at the locking piece. A striker may be provided on the mounting bracket. The vertical moving unit may include a drive motor mounted to the mounting bracket, a rotary screw coupled to the drive motor so as to be rotatable using operation of the drive motor, and/or a vertically movable member engaging with the rotary screw so as to be movable upwards or downwards according to rotation of the rotary screw, the vertically movable member being fastened to a lower end of the headrest pole. The electromotive headrest folding apparatus may further include a folding button for applying power to the drive motor to release the striker from the locking piece.

The locking unit may include a support bracket mounted to the seat back frame, the locking piece rotatably hinged to the support bracket, the locking piece having in a first end thereof a locking notch, to which the striker may be locked, a release piece rotatably hinged to the support bracket such that, when the headrest pole is moved to an uppermost position, a first end of the release piece may be pushed upwards and rotated by the vertically movable member, and/or an elastic member connecting a second end of the release piece to a second end of the locking piece, so that the striker may be released from the locking piece by rotation of the release member. The release piece may further include a protrusion selectively coupled to a receiving notch formed at the locking piece. The locking unit may be provided on a rear surface of the seat back frame. The rotating shaft may be positioned at upper portion of the seat back frame.

Another aspect of the present invention is directed to an electromotive headrest folding system for vehicles. The system may include a rotating shaft rotatably coupled at opposite ends thereof to a seat back frame, a rotary member coupled to the rotating shaft, wherein a headrest pole may be slidably fitted into the rotary member, a vertical moving unit fastened to the rotary member through a mounting bracket, the vertical moving unit moving the headrest pole upwards or downwards, and/or a locking unit mounted to the seat back frame and having a locking piece, to which the rotary member may be selectively locked.

A further still aspect of the present invention is directed to passenger vehicles which may include any of the above-described electromotive headrest folding apparatus.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
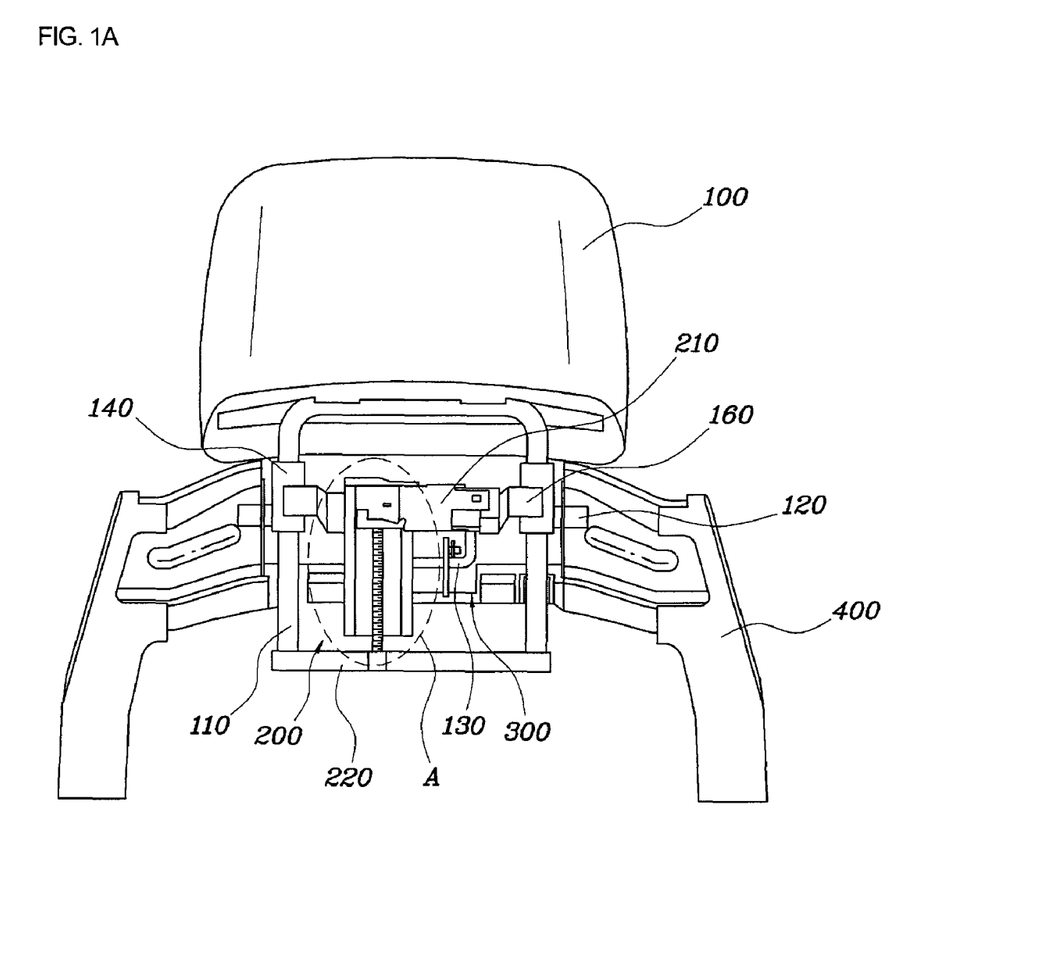
FIG. 1A is a rear view of an exemplary electromotive headrest folding apparatus for vehicles according to the present invention.
Figure 1B:
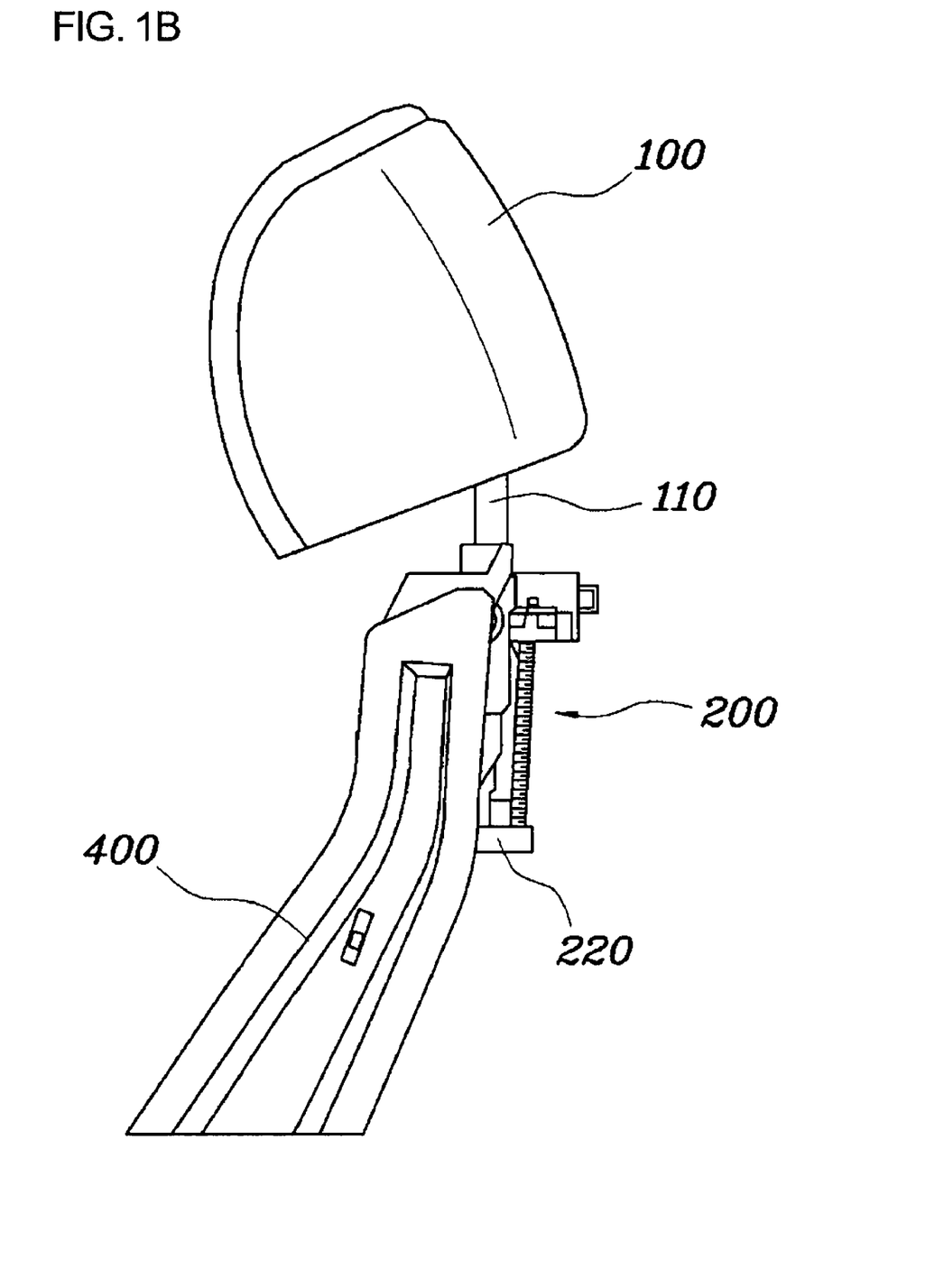
FIG. 1B is a side view of the exemplary electromotive headrest folding apparatus for vehicles FIG. 1A.

As shown in FIGS. 1A and 1B, an electromotive headrest folding apparatus according to an exemplary embodiment of the present invention includes a rotating shaft 120, which is rotatably coupled to a seat back frame 400, rotary members 140, which are fitted over a headrest pole 110 so as to be movable with respect to the headrest pole 110, a vertical moving unit 200, which vertically moves the headrest pole 110, and a locking unit 300, which is fastened to the seat back frame 400.

Figure 2:
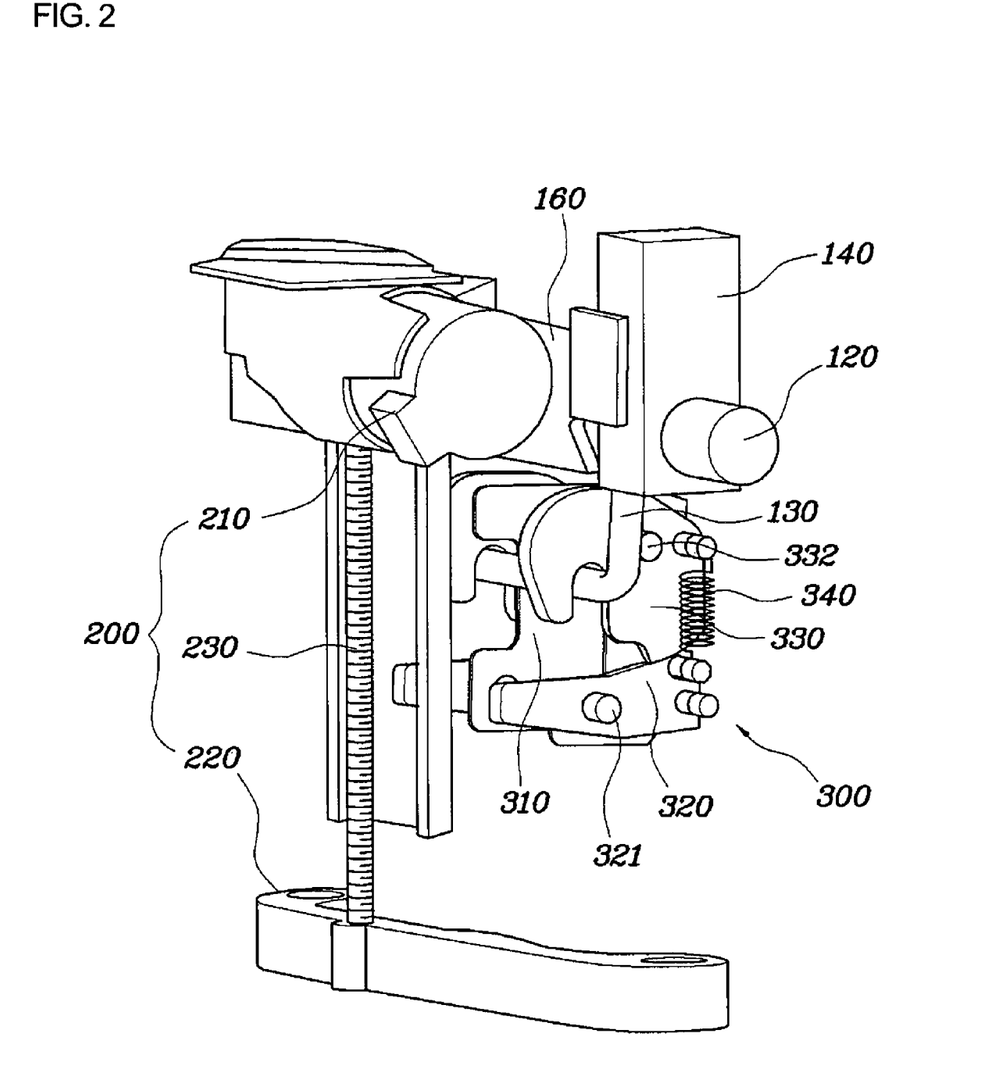
FIG. 2 is a view showing an enlargement of an exemplary electromotive headrest folding apparatus according to the present invention.
Figure 3A:
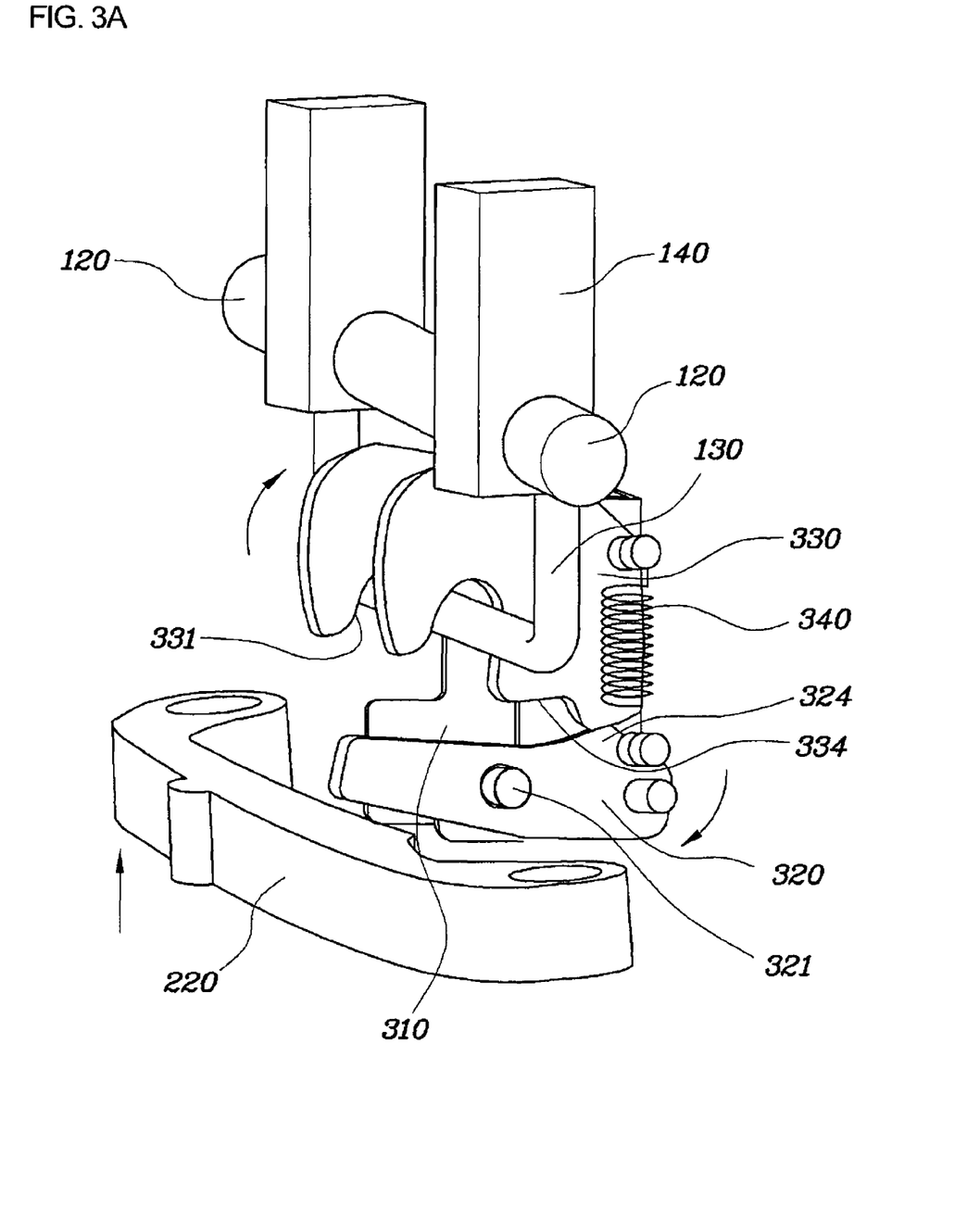
FIGS. 3A and 3B is a view showing the operation of a locking unit of an exemplary electromotive headrest folding apparatus according to the present invention.
Figure 3B:
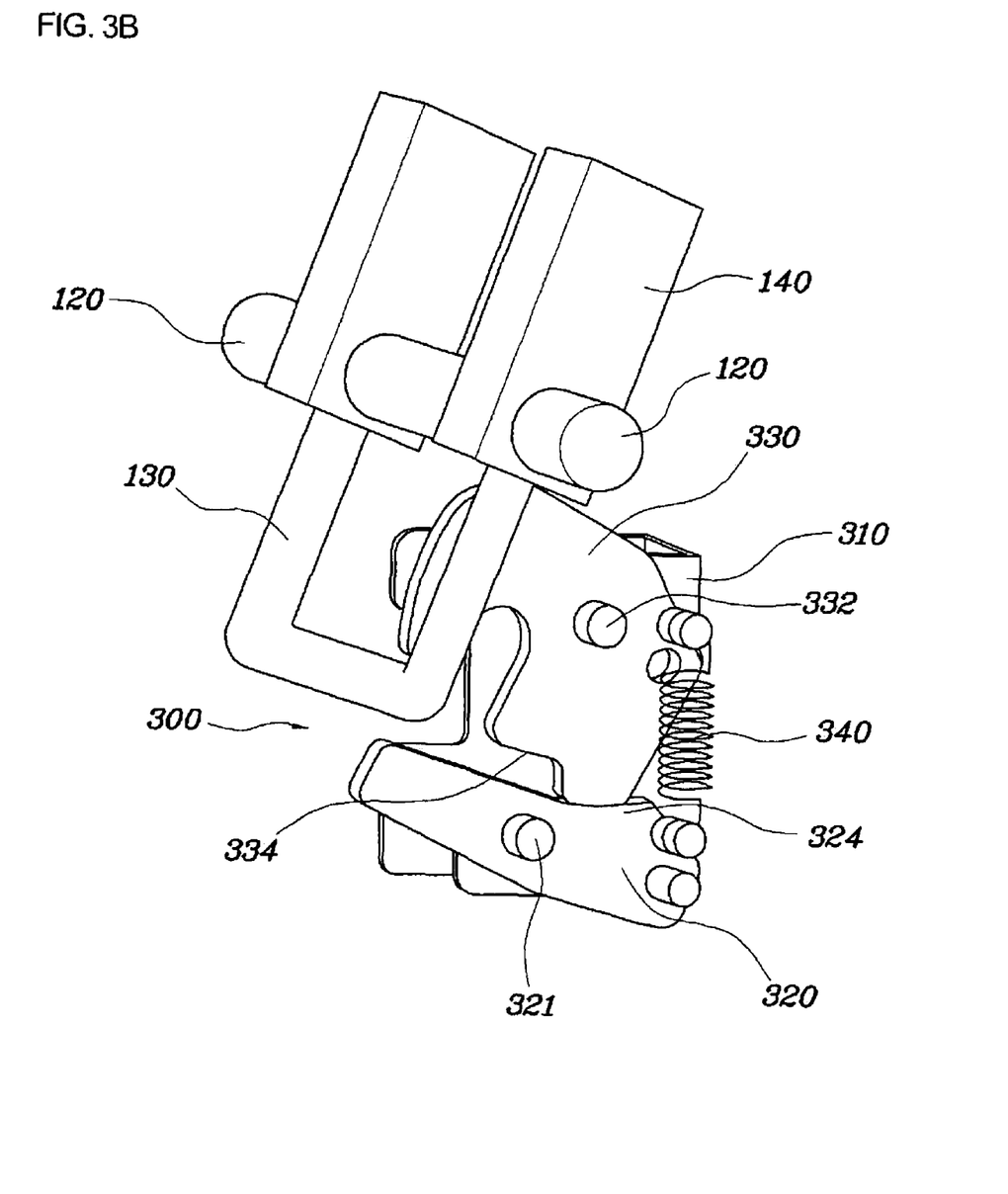

As shown in FIGS. 2 through 3B, the rotating shaft 120 is rotatably provided on the seat back frame 400. The rotating shaft 120 is provided on the upper part of the seat back frame 400, and is oriented in a horizontal direction. The rotating shaft 120 is connected at opposite ends thereof to the seat back frame 400 so as to be rotatable through a separate bracket or bearing.

The rotary members 140 are provided on the respective opposite ends of the rotating shaft 120. Each rotary member 140 has a hollow pipe shape. The rotary members 140 are constructed such that they are rotatable when the rotating shaft 120 rotates. The headrest pole 110 is longitudinally inserted into the rotary members 140 so as to be slidably movable in the vertical direction. The rotating shaft 120 is laterally inserted into and fastened to the rotary members 140.

A striker 130 is provided on the rotating shaft 120. In various embodiments of the present invention, the striker 130 may be provided on a mounting bracket 160 as shown in FIG. 1A. Under normal conditions, the striker 130 is in a state in which it is locked to a locking piece 330 of the locking unit 300, which will be explained later herein, so that the rotating shaft 120 is prevented from rotating. Conversely, when the striker 130 is released from the locking piece 330, the rotating shaft 120 rotates. Then, the rotary members 140, which are fastened to the rotating shaft 120, also rotates with respect to the rotating shaft 120 and thereby the headrest pole 110, which is inserted into the rotary members 140, enters a foldable state.

In detail, the rotary members 140 are provided on the respective opposite ends of the rotating shaft 120, that is, they are disposed at a pair at positions spaced apart from each other by a predetermined distance. The two rotary members 140 are connected to each other through a mounting bracket 160. The vertical moving unit 200 for vertically moving the headrest pole 110 is provided on the mounting bracket 160.

The vertical moving unit 200 includes a drive motor 210, which is provided on the mounting bracket 160, a rotary screw 230, which is coupled to the drive motor 210 so as to be rotatable using the operation of the drive motor 210, and a vertically movable member 220, which engages with the rotary screw 230. When the rotary screw 230 is rotated in one direction by the operation of the drive motor 210, the vertically movable member 220 is moved upwards or downwards by the rotation of the rotary screw 230.

Here, the vertical moving unit 200 may further include a folding button, which is provided on the seat back frame 400. The folding button serves to apply power to the drive motor 210 such that the striker 130 is released from the locking piece 330 by the operation of the drive motor 210.

In various embodiments of the present invention, both ends of the vertically movable member 220 may be fastened to the lower ends of the headrest pole 110. Therefore, when the vertically movable member 220 is vertically moved, the headrest pole 110 is also vertically moved by the vertical movement of the vertically movable member 220, and a headrest 100, which is fastened to the upper end of the headrest pole 110, is also moved in the vertical direction.

When the vertically movable member 220 is moved to the uppermost position, the vertically movable member 220 releases the striker 130, which is in the state of having been locked to the locking piece 330.

To realize this, the locking unit 300 includes a support bracket 310, which is fastened to the upper end of the seat back frame 400, and the locking piece 330, which is coupled to the upper end of the support bracket 310 so as to be rotatable through a hinge shaft 332.

The locking piece 330 has on a first end thereof a locking notch 331, into which the striker 130 is locked and on a second end thereof a receiving notch 334.

The locking unit 300 further includes a release piece 320 comprising a protrusion 324 and an elastic spring 340. The protrusion 324 of the release piece 320 is coupled to the receiving notch 334 displaced at the lower end of the locking piece 330 so as to be rotatable around the hinge shaft 321 when the vertically movable member 220 pushes a first end of the release piece 320. The elastic spring 340 elastically connects a second end of the release piece 320 to a second end of the locking piece 330.

It is preferable that the locking unit 300 having the above-mentioned construction be installed on the rear surface of the seat back frame 400. Thanks to this construction, when the striker 130 is released from the locking piece 330, the upper end of the headrest pole 110 can be folded in front of the seat back frame 400.

The release piece 320 is hinged at the medial portion thereof to the support bracket 310 through the hinge shaft 321, such that opposite ends of the release piece 320 are rotatable around the hinge shaft 321 thereof. In particular, the first end of the release piece 320 is disposed in a path along which the vertically movable member 220 is moved upwards. Thus, when the headrest pole 110 is moved to the uppermost position, the vertically movable member 220 pushes the release piece 320 upwards, so that the protrusion 324 of the release piece 320 is unlocked from the receiving notch 334 of the locking piece 330 and thus rotated around the hinge shaft 321 thereof. The second end of the release piece 320 is elastically connected to the second end of the locking piece 330 through the elastic spring 340.

The locking notch 331, to which the striker 130 is locked, is formed in the first end of the locking piece 330. The locking piece 330 is hinged at the medial portion thereof to the support bracket 310 via the hinge shaft 332. The second end of the locking piece 330 is elastically connected to the second end of the release piece 320. Therefore, when the locking piece 330 is rotated by the pulling of the release piece 320, the striker 130, which has been in the locked state, is released from the locking piece 330.

In brief, when the headrest pole 110 is moved to the uppermost position, the first end of the release piece 320 is clockwise rotated by the vertically movable member 220 which moves upwards as shown in FIG. 3B. At this time, the second end of the release piece 320 pulls the second end of the locking piece 330 by the elastic spring 340, thus rotating the first end of the locking piece 330 clockwise in the drawing. As a result, the striker 130 is released from the locking notch 331 of the locking piece 330. As such, when the striker 130 is released from the locked state, the headrest 100 rotates clockwise. In this state, when the headrest 100 is pushed ahead of the seat back frame 400, the headrest 100 is folded forwards.

The operation of the present invention having the above-mentioned construction will be explained in detail herein below.

Figure 4A:
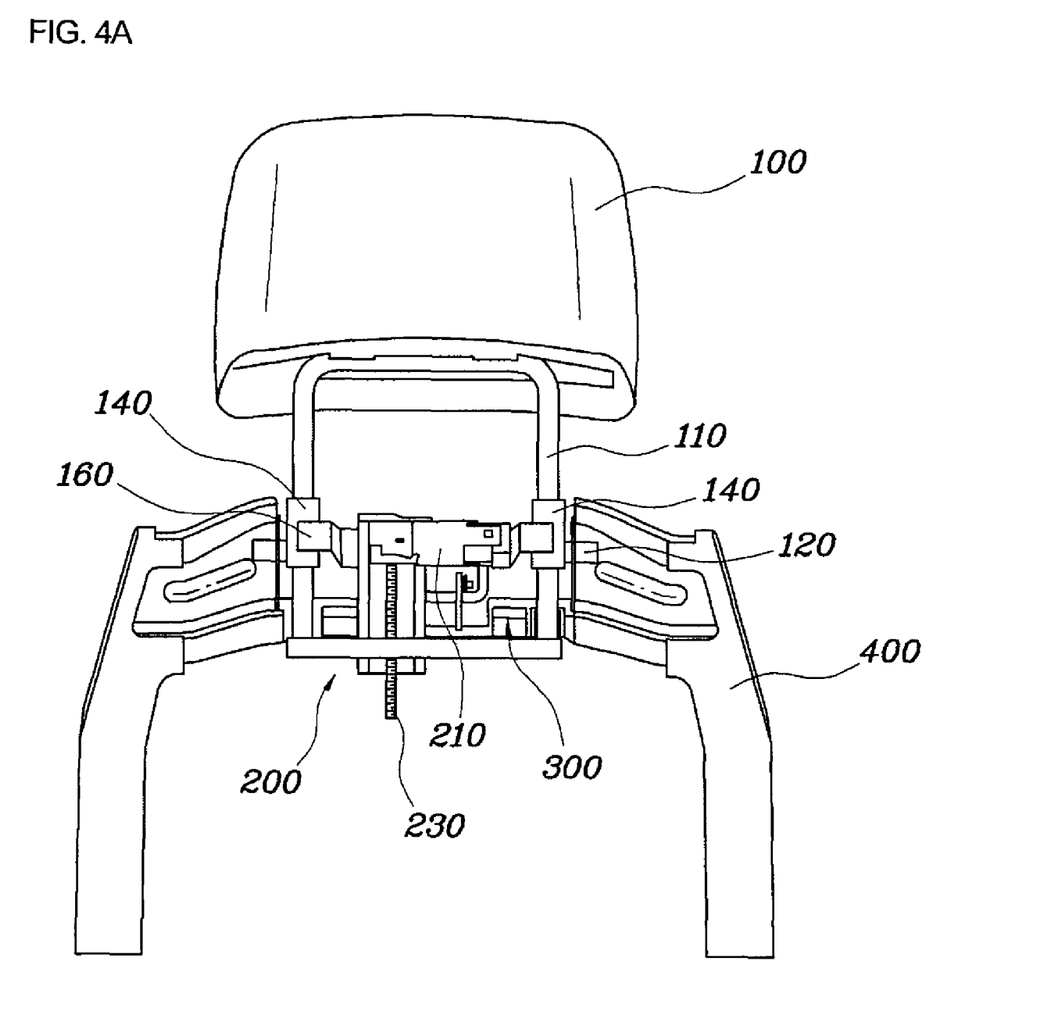
FIG. 4A shows the rear view of an exemplary electromotive headrest folding apparatus when it is not in the folded state in accordance with the present invention.
Figure 4B:
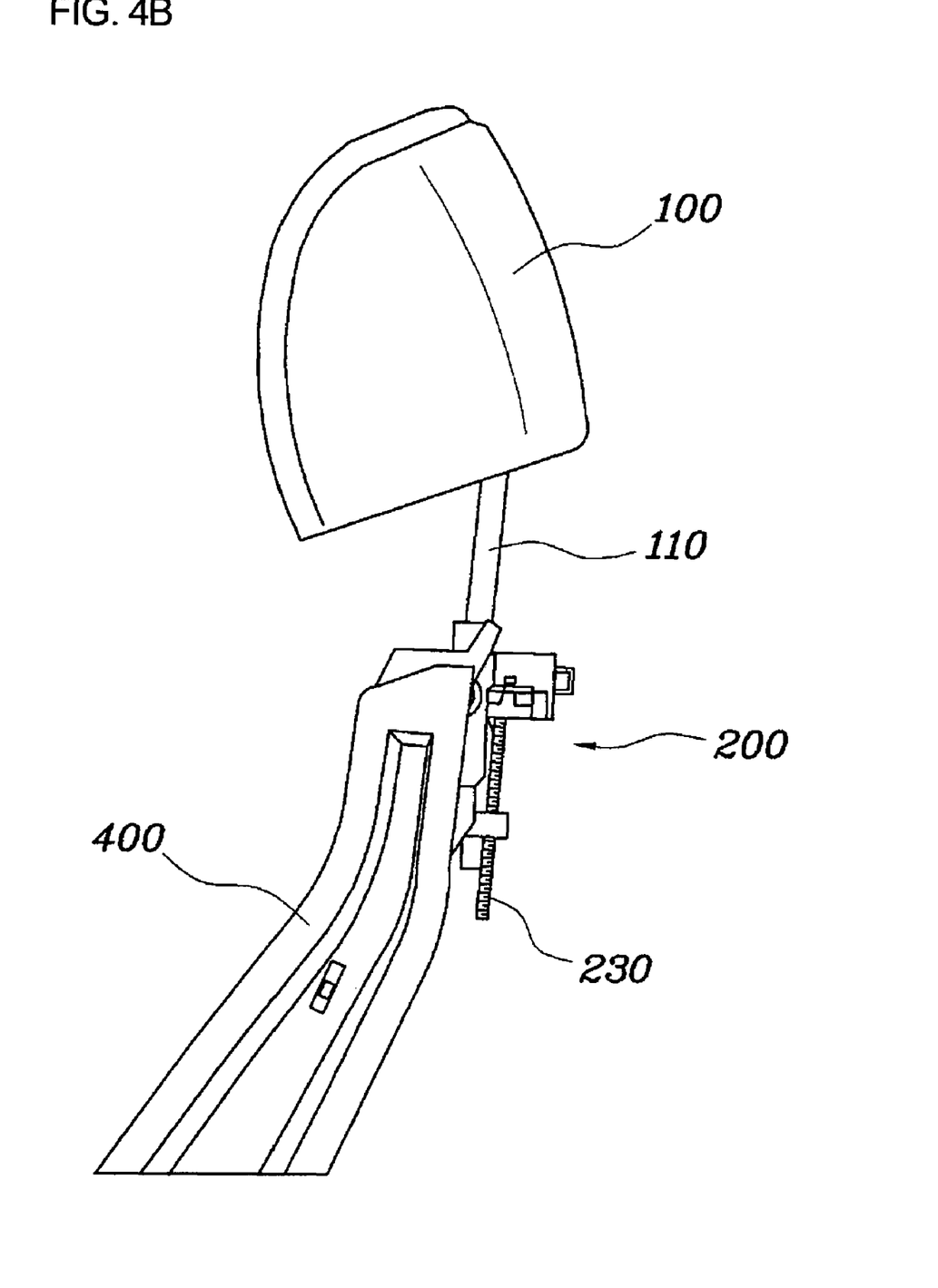
FIG. 4B is a side view of the exemplary electromotive headrest folding apparatus of FIG. 4A.

As shown in FIGS. 4A and 4B, the headrest 100 is constructed such that it can be vertically moved by the operation of the vertical moving unit 200. Hence, as shown in FIG. 2, when the drive motor 210 of the vertical moving unit 200 is operated, the vertically movable member 220 is moved upwards or downwards by the rotation of the rotary screw 230. Then, the height of the headrest 100, which is coupled to the vertically movable member 220 through the headrest pole 110, can be adjusted. That is, the headrest 100 enters a height-adjustment mode.

Figure 5A:
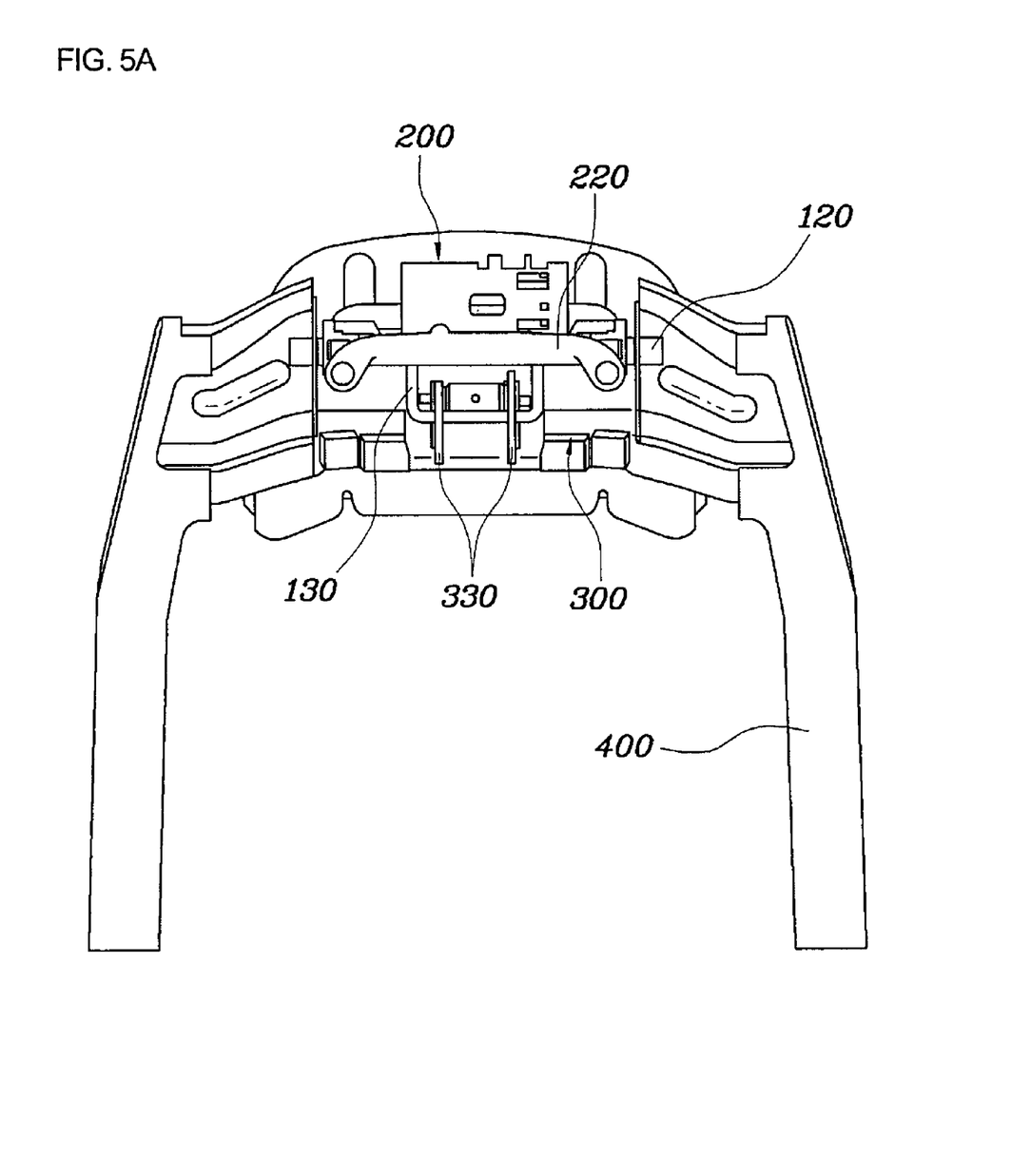
FIG. 5A shows the rear view of an exemplary electromotive headrest folding apparatus when it is in the folded state in accordance with the present invention.
Figure 5B:
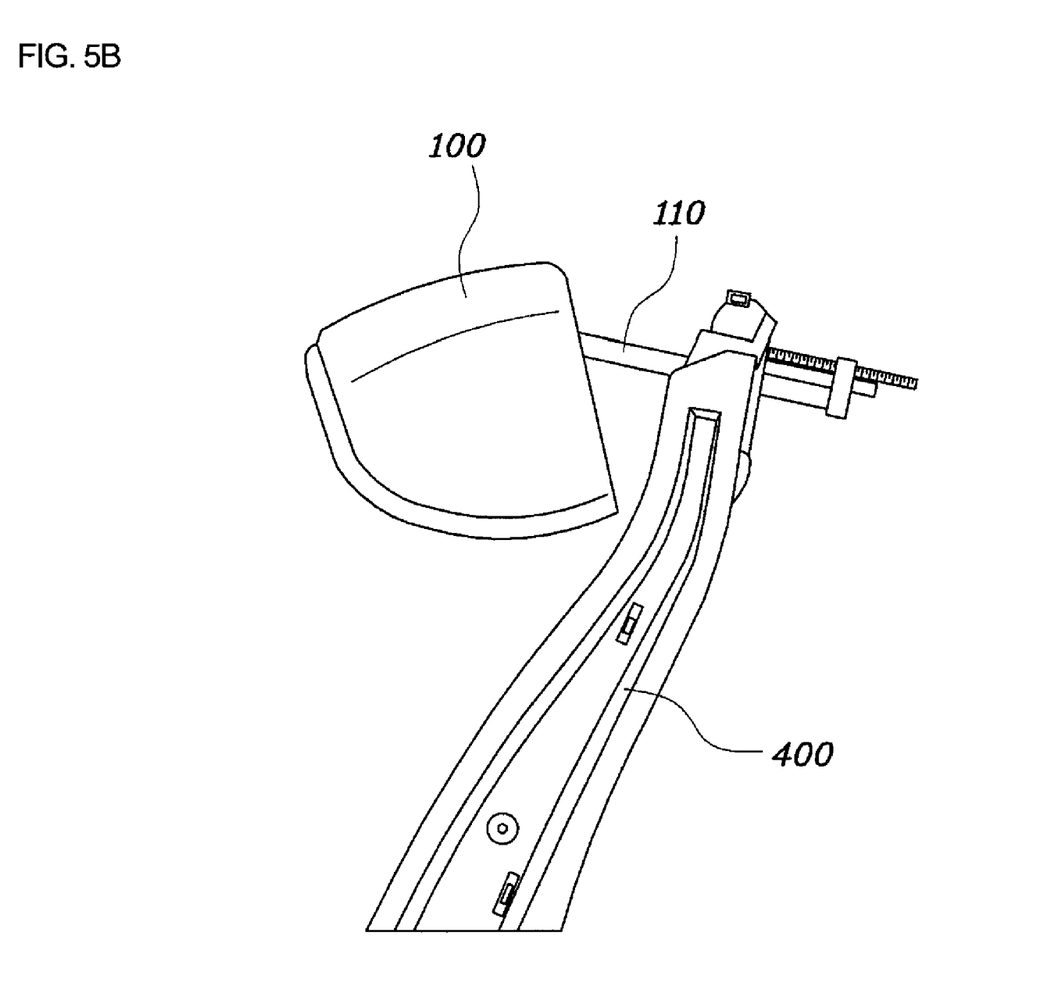
FIG. 5B is a side view of the exemplary electromotive headrest folding apparatus of FIG. 5A.

Meanwhile, as shown in FIGS. 5A and 5B, when the headrest 100, which has moved upwards, reaches the uppermost point, the headrest 100 enters a state of being foldable forwards, i.e., a folding mode. In other words, as shown in FIG. 3, when the vertically movable member 220, which has been moved upwards by the operation of the drive motor 210, reaches the uppermost point, the vertically movable member 220 pushes the first end of the release piece 320. When the release piece 320 is rotated by the pushing operation of the vertically movable member 220, the second end of the release piece 320 pulls the second end of the locking piece 330 and thus rotates the locking piece 330 clockwise. As a result, the striker 130, which is fastened to the rotating shaft 120 of the headrest 100, is released from the state of having been locked to the locking piece 330. In this state, when a user pushes the headrest 100 forwards, the headrest 100 is folded forwards.

Meanwhile, after the headrest 100, which has been folded forwards, is returned to its original position, when the vertically movable member 220 of the vertical moving unit 200 is moved downwards, the striker 330 is automatically locked to the locking piece 330. Thereby, the headrest 100 enters the locked state again.

As described above, in an electromotive headrest folding apparatus according to the present invention, the adjustment of the height of a headrest is implemented by an electromotive method. Hence, the headrest can effectively conduct the intended function of supporting the neck of a user, thus minimizing injuries to the neck of the user attributable to a vehicle collision.

Furthermore, the present invention is constructed such that the adjustment of the height of the headrest is conducted by the electromotive method and the headrest is foldable. Therefore, there are advantages in that the manipulability of the headrest can be improved and the marketability of products can be thus enhanced.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromotive headrest folding apparatus for vehicles, comprising:
   an upright seat back frame;
   a rotating shaft rotatably fixed at opposite ends thereof to an upper end of the seat back frame, wherein the rotating shaft is offset from a rotational axis of the seat back frame;
   a rotary member fixed to the rotating shaft so as to be rotatable relative to the seat back frame with rotation of the rotating shaft, wherein a headrest pole is slidably engaged with and relatively movable with respect to the rotary member;
   a vertical moving unit fastened to the rotary member through a mounting bracket fixed to the rotary member, the vertical moving unit moving the headrest pole upwards or downwards with respect to the rotary member; and
   a locking unit mounted to the seat back frame and having a locking piece, to which the rotary member is selectively locked so that the rotary member rotates relative to the seat back frame with the rotating shaft when the rotary member is unlocked from the locking unit.

2. The electromotive headrest folding apparatus for vehicles as set forth in claim 1, wherein a striker is provided on the rotary member.

3. The electromotive headrest folding apparatus for vehicles as set forth in claim 2, wherein the vertical moving unit comprises:

a drive motor mounted to the mounting bracket;

a rotary screw coupled to the drive motor so as to be rotatable using operation of the drive motor; and a vertically movable member engaging with the rotary screw so as to be movable upwards or downwards according to rotation of the rotary screw, the vertically movable member being fastened to a lower end of the headrest pole;

wherein the vertically movable member releases the striker from the rotary member when the vertically movable member moves upwards.

4. The electromotive headrest folding apparatus for vehicles as set forth in claim 3, further comprising:

a folding button for applying power to the drive motor.

5. The electromotive headrest folding apparatus for vehicles as set forth in claim 3, wherein the locking unit comprises:

a support bracket mounted to the seat back frame;

the locking piece rotatably hinged to the support bracket, the locking piece having in a first end thereof a locking notch, to which the striker is locked;

a release piece rotatably hinged to the support bracket such that, when the headrest pole is moved to an uppermost position, a first end of the release piece is pushed upwards and rotated by the vertically movable member; and an elastic member connecting a second end of the release piece to a second end of the locking piece, so that the striker is released from the locking piece by rotation of the release member.

6. The electromotive headrest folding apparatus for vehicles as set forth in claim 5, wherein the release piece further comprises a protrusion selectively coupled to a receiving notch formed at the locking piece.

7. The electromotive headrest folding apparatus for vehicles as set forth in claim 1, wherein a striker is provided on the mounting bracket.

8. The electromotive headrest folding apparatus for vehicles as set forth in claim 7, wherein the vertical moving unit comprises:

a drive motor mounted to the mounting bracket;

a rotary screw coupled to the drive motor so as to be rotatable using operation of the drive motor; and a vertically movable member engaging with the rotary screw so as to be movable upwards or downwards according to rotation of the rotary screw, the vertically movable member being fastened to a lower end of the headrest pole.

9. The electromotive headrest folding apparatus for vehicles as set forth in claim 7, further comprising:

a folding button for applying power to the drive motor.

10. The electromotive headrest folding apparatus for vehicles as set forth in claim 1, wherein the locking unit is provided on a rear surface of the seat back frame.

11. The electromotive headrest folding apparatus for vehicles as set forth in claim 1, wherein the rotating shaft is positioned at an upper portion of the seat back frame.

12. A passenger vehicle comprising the electromotive headrest folding apparatus for vehicles as set forth in claim 1.

* * * * *